(No Model.)
J. P. MAGI.
BROOM HOLDER.
No. 246,326. Patented Aug. 30, 1881.
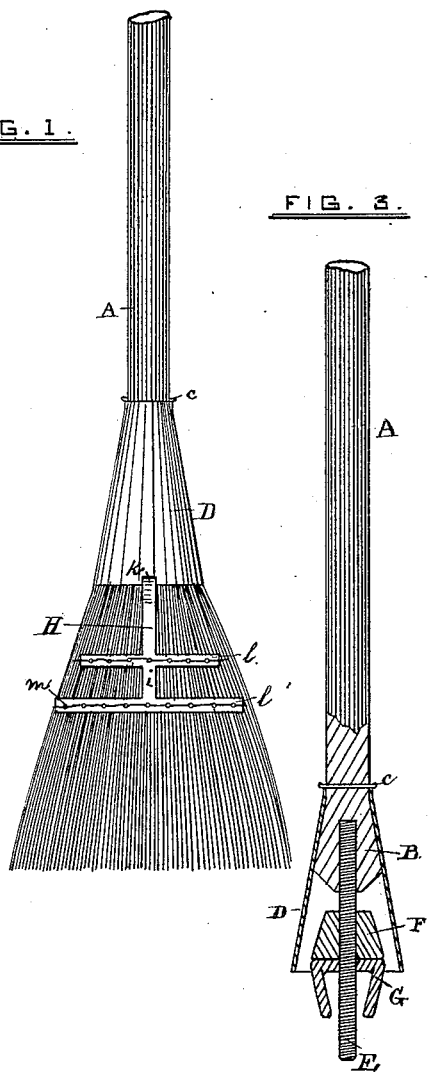
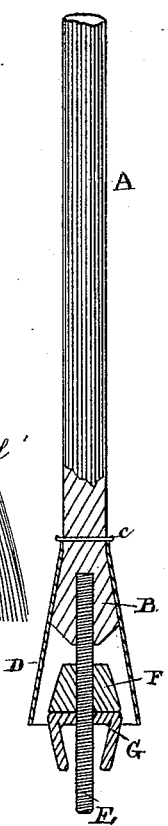
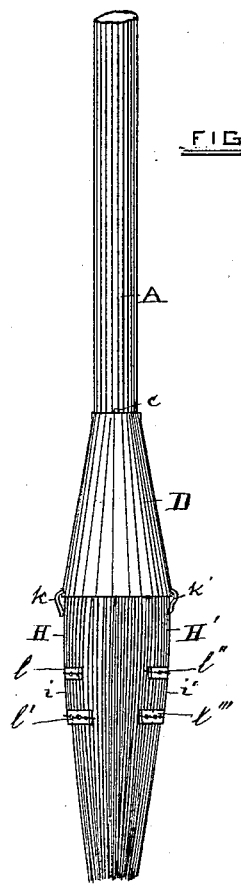
WITNESSES.
J. C. Hubbell
P. J. Finney
INVENTOR.
James P. Magi
BY H. N. Jenkins
ATTORNEY

UNITED STATES PATENT OFFICE.

JAMES P. MAGI, OF NEW ORLEANS, LOUISIANA.

BROOM-HOLDER.

SPECIFICATION forming part of Letters Patent No. 246,326, dated August 30, 1881.

Application filed February 7, 1881. (No model.)

*To all whom it may concern:*

Be it known that I, JAMES P. MAGI, a resident of the city of New Orleans, parish of Orleans, and State of Louisiana, have invented a certain new and useful Improvement in Broom-Holders; and I do hereby declare the following to be a full, clear, and correct description of the same, reference being had to the annexed drawings, making a part of this specification.

This invention consists of a simple and economical means for making brooms, brushes, &c. Its nature is fully shown in the accompanying drawings, whereon—

Figure 1 represents a front view, Fig. 2 a side or edge view, and Fig. 3 a section, thereof.

My improvement will first be described, and then specifically pointed out in the claim.

In the annexed drawings, forming a part of this specification, the letter A represents the handle, having an enlarged end, B, over which is fitted and secured by means of a rivet, $c$, a conical shell, D.

Projecting from the lower extremity of the handle is a screw-stem, E, over which is fitted a washer, F, that serves, when driven forward by a nut, G, to securely bind within the holder the butt-ends of the straw or other material wherewith the holder is to be filled.

In order to give the straw a fan-like shape, and thus admit of its passing over a greater space at one movement, I suspend from recesses in opposite sides of the holder a pair of clamps, H H'. These consist of vertical bars $i\ i$, having hooked ends $k\ k'$, and cross or horizontal pieces $l\ l'\ l''\ l'''$, all of which are perforated, as $m$, to receive wire, cord, or other material for binding the straw in fan-like shape.

Having described my invention, what I claim as new, and desire to secure by Letters Patent, is—

The improved broom-holder hereinbefore described, consisting of the handle A, formed with the enlarged head B, the screw-stem E, loose washer F, nut G, conical shell D, and the clamps H H', all constructed and arranged as set forth.

In testimony whereof I have hereunto signed my name.

J. P. MAGI.

In presence of—
BEN S. THÉARD,
HY. MAIGNAN.